UNITED STATES PATENT OFFICE.

LEON LILIENFELD, OF VIENNA, AUSTRIA-HUNGARY.

METHOD OF PRODUCING STABLE SOLUBLE CELLULOSE DERIVATIVES FROM VISCOSE.

980,648. Specification of Letters Patent. Patented Jan. 3, 1911.

No Drawing. Application filed October 18, 1907. Serial No. 397,953. (Specimens.)

*To all whom it may concern:*

Be it known that I, LEON LILIENFELD, chemist, a subject of the Emperor of Austria-Hungary, and a resident of VIII Zeltgasse 1, Vienna, in the Empire of Austria-Hungary, have invented an Improved Method of Producing Stable Soluble Cellulose Derivatives from Viscose; and I do hereby declare the following to be a full, clear, and exact description of the invention, such as will enable others skilled in the art to which it appertains to make and use the same.

The present invention has for its object an improved method of producing cellulose derivatives. The utility of this new product lies not only in its superior stability (it will remain stable for several months at the ordinary temperature of a room or longer if the temperature is lower), but also in its wider range of adaptability on account of its dry state, its neutral property, and its solubility in water, whereas the ordinary viscose, including cellulose xanthogenate or alkali cellulose-xanthogenate, as produced in known manner by the action of alkali and carbon disulfid on cellulose is a product which possesses but little stability. Also viscose which is purified according to various known methods decomposes both in the form of the precipitates, which are obtained for the purpose of purification, and also in its solutions in a comparatively short time. The same is true of the derivatives of purified or non-purified viscose, for example those which result from its treatment with salts of heavy metals, as zinc, etc. For this reason therefore the ordinary product must be made shortly before use and even then cannot be used for all purposes on account of its alkaline properties.

As indicated above, I use the term "viscose" in a generic sense, not only to denote the substance commonly known by that name, but also its derivatives and compounds in lieu of a better term comprehending the generic features of all of these substances.

I have found that products are obtained from viscose (cellulose-xanthogenate) or its derivatives by treating them with oxidizing agents, particularly with compounds of manganese which have oxidizing properties, which products are stable in a dry state and dissolve well in dilute alkalies alone or in ammonia or in water particularly when heated, the solubility depending upon the particular salt of the cellulose xanthogenate used, the quantity of the oxidizing agent and the temperature.

The present products and their derivatives, or the solutions of the products and their derivatives are suitable for all purposes for which dissolved cellulose or soluble cellulose derivatives are suited.

The layers, films, filaments, masses, etc., which are produced with the aid of the present products can be made insoluble in water as required either by suitable precipitating agents, such as acids, metallic salts, etc., or by steam, or by dry heat, or by seasoning through prolonged contact with the air.

For carrying the method into practice non-purified viscose, or viscose which is purified in known manner, for example by precipitation with salts, etc., or a derivative of the same, as for example a salt of a heavy metal, is treated, preferably cold, with an oxidizing agent, for example permanganate of potassium, preferably in an alkaline solution.

The final product is preferably isolated by treating the reaction-mixture, (which is filtered or not according to the requirements of the case,) with a substance which is able to precipitate the product in question, such as acids, or metallic salts, or a mixture of both acids and salts, or alcohol, or other dehydrating agents. It is self-evident that when the oxidation has been conducted in an alkaline solution, the free product is precipitated by acids, the metal compound of the product is precipitated by metallic salts, and the alkaline salt of the product by alcohol or other dehydrating agent.

If manganese compounds have been used as oxidizing agents, it is preferable to free the resulting precipitates from the adherent manganese compounds. This is best done by washing out the precipitates, which are colored by the manganese, with water, and then by treating them, if they have been precipitated by acids, preferably in an acidulated or neutral solution, with substances which are able to free the precipitates from the manganese compounds, e. g. bisulfite of sodium, sulfurous acid, nitrite of sodium, &c. The same result can be obtained if bisulfite of sodium or the like is added to the reaction-mixture simultaneously with the precipitating agent or shortly after.

The soluble products which are carried away in the wash water consist generally of the salt formed by the reaction between the admixed acid and the caustic alkali existing in the reaction mixture. Furthermore there are other impurities which partly adhere to the viscose, partly were created during the oxidation of the by-products adhering to the viscose. All of these soluble products must be removed.

The well washed and purified free products appear when dry as white to yellowish bodies which can be easily powdered. The products dissolve in dilute alkalies. Also when correct and suitable conditions of working are observed, and when the products are produced carefully, the latter dissolve in solutions which contain 2% or less of alkali, in aqueous ammonia, and also in water particularly when heated. The watery solutions of the free products react neutral to slightly sour. By dissolving the products in alkalies, ammonia, etc., and precipitating the solutions with neutral precipitation-agents in which the products or their appertaining salts are insoluble, or by drying up the solutions in the air, in vacuo, etc., the compounds of the products together with the corresponding bases are obtained.

With many metals, particularly heavy metals, the products give compounds which are insoluble in water, which are easily produced and which are very suitable for many purposes.

*Examples.*

I. 10 kg. of a zinc salt of viscose, produced in known manner and dissolved in 3% to 15% sodium hydroxid containing about 300–360 g. cellulose and, when necessary, clarified by filtration or straining, are mixed by considerable shaking or stirring with a solution containing about 2–3 liters of water and 50–260 g. permanganate of potassium, or the equivalent quantity of potassium manganate. The reaction mixture temporarily has a jelly-like nature, but at last becomes liquid.

II. Crude viscose is purified in known manner by precipitation with sodium chlorid. The precipitate which is obtained is collected at once or after washing with sodium chlorid solution on a filter, or it is pressed in a press and dissolved in dilute sodium hydroxid. 20 parts by weight of such a solution corresponding to about one part by weight of cellulose are mixed with shaking or stirring with ¼–¾ parts by weight of permanganate of potassium or the equivalent quantity of potassium manganate.

In both cases, after standing a considerable time, for example 12 to 24 hours, the reaction mixture is preferably liberated from the undissolved constituents, such as dioxid of manganese, etc., by straining, centrifuging, filtration or the like; or one may precipitate directly and dissolve the dioxid of manganese by a suitable dissolving agent, for example alkali bisulfite, etc.; the reaction mixture is then mixed with an acid, e. g. with dilute hydrochloric acid or with acetic acid. Some sodium bisulfite solution may be added or the precipitate which was colored by the manganese compound may be washed with water, and then decolorized by the treatment with alkali bisulfite in a preferably acid solution. Then the precipitate is washed with water, or with water and alcohol, etc., and dried in vacuo or in the open air. If it is wished to accelerate the drying, the precipitate which may possibly have been washed with alcohol can be dried thoroughly and quickly with ether. If the precipitate contains in addition dioxid of manganese or sulfur, it can be liberated from the same by washing the precipitate with alkali bisulfite or carbon disulfid or both. The precipitate can be subjected to further purification, if it is wished, by redissolving it in lye or ammonia, and precipitating it again with acids.

The salts insoluble in water are obtained by precipitating the solutions of the products or their salts which are soluble in water with solutions of salts of the corresponding metals, such as copper, zinc, etc.

The product obtained by the herein described method remains undecomposed at 0° centigrade, (freezing temperature) for six to twelve months, and at 18° to 20° centigrade, (the ordinary temperature of a room,) for three to four months.

What I claim as my invention and desire to secure by Letters Patent is:

1. In a method of producing soluble cellulose derivatives which are stable in a dry state, the step of treating a solution of a cellulose-xanthogenate with an oxidizing agent, substantially as described.

2. In a method of producing soluble cellulose derivatives which are stable in a dry state, the step of treating a solution of a compound of a cellulose-xanthogenate with a compound of oxygen and manganese, substantially as described.

3. In a method of producing soluble cellulose derivatives which are stable in a dry state, the step of treating a solution of viscose with a permanganate, substantially as described.

4. A method of producing soluble cellulose derivatives which are stable in a dry state consisting in dissolving a cellulose-xanthogenate in an alkaline solution, in adding an oxidizing agent thereto whereby cellulose derivatives are obtained in solution, and in precipitating said derivatives, substantially as described.

5. A method of producing soluble cellulose derivatives which are stable in a dry state consisting in dissolving a cellulose-xanthogenate in sodium hydroxid, in mixing permanganate of potassium in excess therewith, in separating the reaction mixture from the undissolved constituents, and in adding an acid to the reaction mixture, whereby a cellulose derivative is precipitated, substantially as described.

6. A method of producing soluble cellulose derivatives which are stable in a dry state, consisting in dissolving viscose in sodium hydroxid, in mixing permanganate of potassium in excess therewith, in separating the reaction mixture from the undissolved constituents, in adding acetic acid and some sodium bisulfite solution to the reaction mixture, whereby a cellulose derivative is precipitated, in separating the precipitate, washing the same, purifying the precipitate and finally drying it, substantially as described.

7. A method for producing soluble cellulose derivatives which are stable in a dry state, consisting in dissolving viscose in sodium hydroxid, in mixing permanganate of potassium in excess therewith, in separating the reaction mixture from the undissolved constituents, in adding acetic acid and some sodium bisulfite solution to the reaction mixture, whereby a cellulose derivative is precipitated, in separating the precipitate and washing the same with alkali bisulfite, purifying the precipitate by redissolving the same in ammonia, and adding an acid thereto, whereby the cellulose derivative is precipitated again and finally drying, substantially as described.

In testimony whereof I have signed my name to this specification in the presence of two subscribing witnesses.

LEON LILIENFELD.

Witnesses:
 WENSEL SINKE,
 ROBERT W. HEINGARTNER.